United States Patent
Koop

(10) Patent No.: US 11,981,766 B2
(45) Date of Patent: May 14, 2024

(54) METHOD FOR PRODUCING AMIDO-METHYLATED VINYL-AROMATIC BEAD POLYMERS

(71) Applicant: LANXESS Deutschland GmbH, Cologne (DE)

(72) Inventor: Bernd Koop, Cologne (DE)

(73) Assignee: LANXESS Deutschland GmbH, Cologne (DE)

( * ) Notice: Subject to any disclaimer, the term of this patent is extended or adjusted under 35 U.S.C. 154(b) by 713 days.

(21) Appl. No.: 17/251,717

(22) PCT Filed: Jun. 11, 2019

(86) PCT No.: PCT/EP2019/065115
§ 371 (c)(1),
(2) Date: Dec. 11, 2020

(87) PCT Pub. No.: WO2019/238625
PCT Pub. Date: Dec. 19, 2019

(65) Prior Publication Data
US 2021/0115170 A1  Apr. 22, 2021

(30) Foreign Application Priority Data
Jun. 14, 2018 (EP) .................................... 18177652

(51) Int. Cl.
C08F 8/30 (2006.01)
C08F 212/08 (2006.01)
C08F 212/36 (2006.01)
C08K 5/02 (2006.01)

(52) U.S. Cl.
CPC .............. *C08F 8/30* (2013.01); *C08F 212/08* (2013.01); *C08F 212/36* (2013.01); *C08K 5/02* (2013.01); *C08F 2800/20* (2013.01)

(58) Field of Classification Search
CPC ........ C08F 212/08; C08F 212/36; C08F 8/30; C08K 5/02
See application file for complete search history.

(56) References Cited

U.S. PATENT DOCUMENTS

| | | | |
|---|---|---|---|
| 3,925,264 A | 12/1975 | Corte et al. | |
| 4,232,125 A | 11/1980 | Buske | |
| 4,427,794 A | 1/1984 | Lange | |
| 9,834,653 B2 * | 12/2017 | Klipper | C02F 1/42 |
| 2016/0108199 A1 | 4/2016 | Klipper et al. | |
| 2020/0109225 A1 | 4/2020 | Koop | |

FOREIGN PATENT DOCUMENTS

GB 867449 A * 5/1961

OTHER PUBLICATIONS

European Search Report from corresponding European Application No. 18/177,652, dated Nov. 14, 2018, two pages.
Organikum, VEB Deutscher Verlag der Wissenschaften, Berlin 1968, 8th edition, p. 479.

* cited by examiner

*Primary Examiner* — Vu A Nguyen
(74) *Attorney, Agent, or Firm* — Nicanor A. Kohncke; Christopher L. McDavid; Alyson J. DiLena

(57) ABSTRACT

The invention relates to a process for preparing amidomethylated vinylaromatic bead polymers.

12 Claims, No Drawings

METHOD FOR PRODUCING AMIDO-METHYLATED VINYL-AROMATIC BEAD POLYMERS

The invention relates to a process for preparing amidomethylated vinylaromatic bead polymers.

The preparation of amidomethylated vinylaromatic bead polymers has long been known. DE-A 2211134 discloses that crosslinked styrene bead polymers can be condensed with N-hydroxymethylphthalimide in the presence of swelling agents and Friedel-Crafts catalysts. Disadvantages of this process are that the N-hydroxymethylphthalimide must first be prepared from phthalimide, that water must be distilled off during the reaction, that hydrohalic acid must be added, and that the yield of the amidomethylated vinylaromatic bead polymers is unsatisfactory.

A further process for preparing amidomethylated vinylaromatic bead polymers in which phthalimide, paraformaldehyde, sulfuric acid are reacted in one step in the presence of 1,2-dichloroethane as swelling agent and the vinylaromatic bead polymer is known from U.S. Pat. No. 4,232,125. Different swelling agents as alternatives to 1,2-dichloroethane are mentioned therein. What is likewise disadvantageous about this process is that the yield of the amidomethylated vinylaromatic bead polymers is unsatisfactory.

A further one-step process for preparing amidomethylated vinylaromatic bead polymers in which the swelling agent used is 1,3-dichloropropane is known from EP-A 3012272. This swelling agent can be industrially separated from the product only by complex methods, and is therefore economically inferior. Here too, the yields of amidomethylated vinylaromatic bead polymers are still too low.

There was therefore still a need for a process that overcomes the disadvantages of the prior art, by which amidomethylated vinylaromatic bead polymers can be prepared in an efficient manner.

It has now been found that, surprisingly, the reaction of vinylaromatic bead polymers with condensed formaldehyde and protic acids and in the presence of selected brominated swelling agents proceeds under suitable reaction conditions to give amidomethylated vinylaromatic bead polymers with high yields.

The present invention therefore provides a process for preparing amidomethylated vinylaromatic bead polymers in which at least one vinylaromatic bead polymer is reacted with at least one compound of the formula (I) or salts thereof

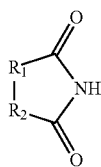
(I)

where $R_1$=—CH—($C_1$-$C_6$-alkyl) or —$CH_2$— and $R_2$=—CH—($C_1$-$C_6$-alkyl) or —$CH_2$— or $R_1$ and $R_2$ are two carbon atoms of an aromatic $C_6$ ring optionally substituted by one or two $C_1$-$C_6$-alkyl radicals, or $R_1$ and $R_2$ are each —CH=, and at least one condensed formaldehyde in the presence of at least one protic acid and in the presence of at least one compound of the formula (II)

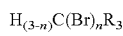
(II)

where $R_3$=$C_1$-$C_4$-alkyl, Br, H or $C_1$-$C_4$-bromoalkyl and n may be 0 or 1, where, if n=0, $R_3$=$C_1$-$C_4$-bromoalkyl or Br.

$R_1$ and $R_2$ preferably combine to form an optionally $C_1$-$C_6$-alkyl-substituted aromatic $C_6$ ring. $R_1$ and $R_2$ more preferably combine to form a benzene ring optionally substituted by $C_1$-$C_4$-alkyl. It is very particularly preferable for compounds of formula (I) to be phthalimide, succinimide or maleimide. It is yet more preferable for the compound of formula (I) to be phthalimide. When phthalimide is used, the invention provides phthalimidomethylated bead polymers. Salts of the compounds of the formula (I) are preferably understood to mean addition products of organic or inorganic acids or alkalis with compounds of the formula (I), such as alkali metal or alkaline earth metal salts, chloride, sulfate, sulfite, phosphate, phosphite, acetate, oxalate, tartrate, formate or citrate. Any salts used are more preferably the chlorides or sulfates of the compounds of the formula (I).

In formula (II), $C_1$-$C_4$-bromoalkyl is a $C_1$-$C_4$-alkyl radical monosubstituted by bromine atoms. For example and with preference, $C_1$-$C_4$-bromoalkyl is bromomethyl, 1-bromoethyl, 2-bromoethyl, 1-bromopropyl, 2-bromopropyl, bromocyclopropyl, 1-bromobutyl, 2-bromobutyl or 3-bromobutyl.

More preferably, $C_1$-$C_4$-bromoalkyl is 1-bromoethyl and 2-bromoethyl.

$R_3$ is preferably $C_1$-$C_4$-bromoalkyl.

Preferably, n=1.

In the context of the invention, $C_1$-$C_6$-alkyl is a straight-chain, cyclic, branched or unbranched alkyl radical having 1 to 6 carbon atoms. For example and with preference, $C_1$-$C_6$-alkyl is methyl, ethyl, n-propyl, isopropyl, cyclopropyl, n-propyl, n-, i-, s- or t-butyl, pentyl or hexyl.

In the context of the invention, $C_1$-$C_4$-alkyl is a straight-chain, cyclic, branched or unbranched alkyl radical having 1 to 4 carbon atoms. For example and with preference, $C_1$-$C_4$-alkyl is methyl, ethyl, n-propyl, isopropyl, cyclopropyl, n-propyl, n-, i-, s- or t-butyl.

$C_1$-$C_4$-Alkyl is preferably methyl, ethyl, n-propyl and isopropyl.

Condensed formaldehyde is to be understood as meaning condensates of formaldehyde. Compounds of this type are prepared by customary methods known to a person skilled in the art. Compounds used as condensed formaldehydes include, for example, those of formula (III)

(III)

where n=8 to 100. Preference is given to using compounds of the formula (III) in which n=8 to 15. Particular preference is given to using compounds of the formula (III) in which n=8 to 30.

But it is also possible to use cyclic condensates, for example trioxane. The condensed formaldehyde used is more preferably paraformaldehyde or trioxane, or mixtures of these compounds. The condensed formaldehyde used is most preferably paraformaldehyde.

The compounds of the formula (II) are especially swelling agents for the bead polymers, but likewise serve as solvents for the further reactants in the amidoalkylation reaction. Compounds of the formula (II) used in the context of the invention are preferably bromomethane, bromoethane, 1-bromopropane, 2-bromopropane, 1-bromobutane, 2-bromobutane, dibromomethane, 1,2-dibromoethane, 1,1-dibromoethane, 1,3-dibromopropane, 1,2-dibromopropane, 1,1- dibromopropane, 1,4-dibromobutane or 1,2-dibromobutane or mixtures of these compounds. Compounds of the formula (II) used are more preferably dibromomethane or 1,3-dibromopropane, or mixtures of these compounds. The compound of the formula (II) used is most preferably dibromomethane.

Protic acids used may, for example, be inorganic or organic protic acids. Inorganic protic acids used are, for example, hydrochloric acid, sulfuric acid, oleum, nitric acid, nitrous acid, sulfurous acid, aliphatic or aromatic methane-, benzene- or toluenesulfonic acids, or phosphoric acid. Useful organic protic acids include, for example, oxalic acid, acetic acid or formic acid. Preference is given to using inorganic protic acids. The protic acids used are more preferably sulfuric acid or oleum.

Bead polymers for the purposes of the present invention are spherical crosslinked polymers. The term "vinylaromatic" in the context of the invention includes polyvinylaromatic and monovinylaromatic monomers. The vinylaromatic bead polymers are prepared using at least one monovinylaromatic compound and at least one polyvinylaromatic compound, for example. However, it is also possible to use mixtures of two or more monovinylaromatic compounds and mixtures of two or more polyvinylaromatic compounds. Preference is given to preparing the vinylaromatic bead polymers by using at least one monovinylaromatic compound and at least one polyvinylaromatic compound.

Monovinylaromatic compounds used in the context of the present invention are preferably styrene, vinyltoluene, ethylstyrene, a-methylstyrene, chlorostyrene and chloromethylstyrene.

Particular preference is given to using styrene or mixtures of styrene with the aforementioned monomers.

Preferred polyvinylaromatic compounds in the context of the present invention are divinylbenzene, divinyltoluene, trivinylbenzene, divinylnaphthalene or trivinylnaphthalene.

The polyvinylaromatic compounds are preferably used in amounts of 1-20% by weight, more preferably in amounts of 2-12% by weight, most preferably 4-10% by weight, based on the monomer or mixture thereof with further monomers. The type of polyvinylaromatic compound (crosslinker) is selected with a view to the later use of the bead polymer. Divinylbenzene is suitable in many cases. Commercial divinylbenzene grades which, in addition to the isomers of divinylbenzene, also contain ethylvinylbenzene are sufficient for most applications.

In a preferred embodiment, the vinylaromatic bead polymers are styrene/divinylbenzene-crosslinked copolymers.

In a preferred embodiment of the present invention, microencapsulated monomer droplets are used.

Possible materials for the microencapsulation of monomer droplets are those known for use as complex coacervates, especially polyesters, natural and synthetic polyamides, polyurethanes, polyureas.

Being a natural polyamide, gelatin, for example, is of particularly good suitability. The latter is especially employed in the form of a coacervate and complex coacervate. Gelatin-containing complex coacervates in the context of the invention are understood to mean, in particular, combinations of gelatin with synthetic polyelectrolytes. Suitable synthetic polyelectrolytes are copolymers incorporating units of, for example, maleic acid, acrylic acid, methacrylic acid, acrylamide and methacrylamide. Particular preference is given to using acrylic acid and acrylamide. Gelatin-containing capsules can be hardened with conventional hardeners, for example formaldehyde or glutaraldehyde. The encapsulation of monomer droplets with gelatin, gelatin-containing coacervates and gelatin-containing complex coacervates is extensively described in EP A 0 046 535. The methods for encapsulation with synthetic polymers are known. An example of a very useful method is that of phase interface condensation where a reactive component, for example an isocyanate or an acyl chloride, dissolved in monomer droplets is made to react with a second reactive component, for example an amine, dissolved in the aqueous phase.

The optionally microencapsulated monomer droplets optionally contain an initiator or mixtures of initiators to induce the polymerization. Useful initiators for the method of the present invention are preferably peroxy compounds such as dibenzoyl peroxide, dilauroyl peroxide, bis(p-chlorobenzoyl) peroxide, dicyclohexyl peroxydicarbonate, tert-butyl peroctoate, tert-butyl peroxy-2-ethylhexanoate, 2,5-bis(2-ethylhexanoylperoxy)-2,5-dimethylhexane or tert-amylperoxy-2-ethylhexane, and also azo compounds such as 2,2'-azobis(isobutyronitrile) or 2,2'-azobis(2-methylisobutyronitrile).

The initiators are preferably used in amounts of 0.05% to 2.5% by weight, more preferably in amounts of 0.1% to 1.5% by weight, based on the monomer mixture.

Porogens may optionally be further used in the optionally microencapsulated monomer droplets in order to generate a macroporous structure in the bead polymer. Suitable porogens include organic solvents that are poor solvents and/or swellants for the polymer formed. Preference is given to hexane, octane, isooctane, isododecane, methyl ethyl ketone, butanol or octanol and isomers thereof. Particular preference is given to using isododecane as porogen. Preference is given to using porogens in the preparation of the amidomethylated vinylaromatic bead polymers of the invention.

The term "microporous" or "in gel form"/"macroporous" have already been described in detail in the technical literature.

Preferred bead polymers for the purposes of the present invention have a macroporous structure.

What is preferably meant by "macroporous" in the context of the invention is that the pores in the bead polymer are ≥50 nm.

The optionally microencapsulated monomer droplets may optionally also contain up to 30% by weight (based on the monomer) of crosslinked or uncrosslinked polymer. Preferred polymers derive from the aforementioned monomers, more preferably from styrene.

Bead polymers can be prepared in heterodisperse or monodisperse form. The preparation of heterodisperse bead polymers is accomplished by general processes known to those skilled in the art, for example with the aid of suspension polymerization.

Preference is given to preparing monodisperse vinylaromatic bead polymers in the process of the invention.

In the present application, monodisperse materials are those in which at least 90% by volume or 90% by mass of the particles have a diameter within ±10% of the most common diameter.

For example, in the case of a material having a most common diameter of 0.5 mm, at least 90% by volume or 90% by mass is within a size range between 0.45 mm and 0.55 mm; in the case of a material having a most common diameter of 0.7 mm, at least 90% by volume or 90% by mass is within a size range between 0.77 mm and 0.63 mm.

The monodisperse bead polymer is obtainable by the methods known from the literature. The aqueous phase involved in preparing monodisperse vinylaromatic bead polymers may optionally contain a dissolved polymerization inhibitor. Preferably, the aqueous phase does contain a dissolved polymerization inhibitor. Both organic and inorganic inhibitors are useful for the purposes of the present invention. Examples of inorganic inhibitors are nitrogen compounds such as hydroxylamine, hydrazine, sodium nitrite and potassium nitrite, salts of phosphorous acid such as sodium hydrogenphosphite, and also sulfur compounds such as sodium dithionite, sodium thiosulfate, sodium sulfite, sodium bisulfite, sodium thiocyanate and ammonium thiocyanate. Examples of organic inhibitors are phenolic compounds such as hydroquinone, hydroquinone monomethyl ether, resorcinol, catechol, tert-butylcatechol, pyrogallol and condensation products of phenols with aldehydes. Useful organic inhibitors further include nitrogen compounds. These include hydroxylamine derivatives such as, for example, N,N-diethylhydroxylamine, N-isopropylhydroxylamine and also sulfonated or carboxylated N-alkylhydroxylamine or N,N-dialkylhydroxylamine derivatives, hydrazine derivatives such as, for example, N,N-hydrazinodiacetic acid, nitroso compounds such as, for example, N-nitrosophenylhydroxylamine, N-nitrosophenylhydroxylamine ammonium salt or N-nitrosophenylhydroxylamine aluminum salt. The concentration of the inhibitor is preferably 5-1000 ppm, based on the aqueous phase, more preferably 10-500 ppm and even further preferably 10-250 ppm.

The polymerization of the optionally microencapsulated monomer droplets to form the monodisperse vinylaromatic bead polymer is optionally carried out, as already mentioned above, in the presence of one or more protective colloids in the aqueous phase. Useful protective colloids include natural or synthetic water-soluble polymers, for example, gelatin, starch, polyvinyl alcohol, polyvinylpyrrolidone, polyacrylic acid, polymethacrylic acid or copolymers formed from (meth)acrylic acid and from (meth)acrylic esters. Very useful protective colloids further include cellulose derivatives, in particular cellulose esters and cellulose ethers, such as carboxymethylcellulose, methylhydroxyethylcellulose, methylhydroxypropylcellulose and hydroxyethylcellulose. Gelatin is particularly useful. The amount of the protective colloids used is preferably 0.05% to 1% by weight, based on the aqueous phase, more preferably 0.05% to 0.5% by weight.

The polymerization to form the monodisperse vinylaromatic bead polymer may optionally also be carried out in the presence of a buffer system. Preferred buffer systems establish the pH of the aqueous phase at the start of the polymerization at a value between 14 and 6, preferably between 12 and 8. Under these conditions, protective colloids having carboxylic acid groups are wholly or partly present as salts. This has a favorable effect on the action of the protective colloids. Buffer systems of particularly good suitability contain phosphate or borate salts. The terms "phosphate" and "borate" in the context of the invention also include the condensation products of the ortho forms of corresponding acids and salts. The concentration of the phosphate/borate in the aqueous phase is preferably 0.5-500 mmol/l, more preferably 2.5-100 mmol/l.

The stirrer speed in the polymerization is less critical and, in contrast to conventional bead polymerization, has no effect on the particle size. Low stirrer speeds sufficient to keep the suspended monomer droplets in suspension and to promote the removal of the heat of polymerization are employed. Various stirrer types can be used for this task. Particularly suitable stirrers are axial-action gate stirrers.

The volume ratio of encapsulated monomer droplets to aqueous phase is preferably 1:0.75 to 1:20, more preferably 1:1 to 1:6.

The polymerization temperature depends on the fragmentation temperature of the initiator used. It is preferably between 50 to 180° C., more preferably between 55 and 130° C. The polymerization preferably lasts for 0.5 hour to a few hours. It has been found to be useful to employ a temperature program in which the polymerization is commenced at low temperature, for example 60° C., and the reaction temperature is raised with increasing polymerization conversion. In this way, for example, the requirement for reliable running of the reaction and high polymerization conversion can be fulfilled very efficiently. After the polymerization, the polymer is isolated by conventional methods, preferably by filtering or decanting, and optionally washed.

In a further step, the vinylaromatic bead polymer is reacted with at least one compound of the formula (I), at least one condensed formaldehyde, in the presence of at least one compound of the formula (II) and in the presence of at least one protic acid to form the amidomethylated vinylaromatic bead polymer.

For example, the vinylaromatic bead polymer may initially be swelled and mixed in this state with a mixture formed from the compounds of formula (I), from the condensed formaldehyde and from the protic acids. However, it would be equally possible first to add the compounds of the formula (I) to the crosslinked bead polymers in the presence of the compound of the formula (II) and then to add the condensed formaldehyde and then the protic acids. Or the protic acid is added to an initial charge of the compounds of the formulae (I), (II) and (III), followed by the vinylaromatic bead polymer. Preferably, the crosslinked bead polymer is first swelled in the presence of the compound of the formula (II) and then the compounds of formula (I) or the condensed formaldehyde are added and then the protic acid is added. The compound of the formula (II) is preferably separated off by distillation. The reaction products are worked up by processes known to those skilled in the art. Preferably, the reaction mixture is heated. The reaction is preferably carried out as a one-pot reaction. The reaction is preferably performed without separating intermediates that form from the reaction solution.

The molar ratio of the compounds of the formula (II) to the compounds of the formula (I) is preferably 2:1 to 15:1. More preferably, the molar ratio of the compounds of the formula (II) to the compounds of the formula (I) is 3.5:1 to 10:1.

The molar ratio of the aromatic groups in the vinylaromatic bead polymer to the compounds of the formula (I) is, for example, 0.2:1 to 2.5:1. The molar ratio of the aromatic groups in the vinylaromatic bead polymer to the compounds of formula (I) is preferably in the range from 0.5:1 to 1.8:1.

The molar ratio of compounds of the formula (I) to condensed formaldehyde is, for example, 0.7:1 to 1.3:1. The molar ratio of compounds of the formula (I) to condensed formaldehyde is preferably 0.95:1 to 1.1:1.

The molar ratio of the compounds of the formula (I) to the protic acid used is preferably between 10:1 and 1:10. The molar ratio of the compounds of the formula (I) to the protic acid used is more preferably 1:1 to 1:10.

If the protic acid used is sulfuric acid, the concentration of the acid used is preferably 70% to 100%.

The reaction temperature for the conversion of the vinylaromatic bead polymers to the amidomethylated vinylaromatic bead polymers is preferably between 0° C. and the boiling point of the swelling agents, measured under standard conditions at 1 bar. More preferably, the reaction temperature for the conversion of the vinylaromatic bead polymers to the amidomethylated vinylaromatic bead polymers is between 10° C. and 80° C.

The reaction is generally performed under standard pressure. The reaction may alternatively be performed at higher or lower pressures.

The amidomethylated vinylaromatic bead polymers are, in particular, significant intermediates for the production of ion exchangers and chelating resins. It is thus possible, for instance, to prepare ion exchangers, in particular anion exchangers, and chelating resins from the amidomethylated vinylaromatic bead polymers prepared by the process of the invention.

The amidomethylated vinylaromatic bead polymer is then convertible in a further step to aminomethylated vinylaromatic bead polymers. The amidomethylated vinylaromatic bead polymer is preferably converted further to aminomethylated vinylaromatic bead polymers. The conversion is preferably effected by treating the amidomethylated vinylaromatic bead polymer with aqueous or alcoholic solutions of an alkali metal hydroxide, such as sodium hydroxide or potassium hydroxide, at temperatures between 100° C. and 250° C., preferably at temperatures between 120° C. and 190° C. It is preferable to perform the conversion with alkali metal or alkaline earth metal hydroxides or mixtures thereof, more preferably with alkali metal hydroxides, in particular sodium hydroxide. The conversion is preferably carried out in the presence of an aqueous or alcoholic solution of an alkali metal hydroxide. The concentration of the sodium hydroxide solution is in the range from 10% to 50% by weight, preferably 20% to 40% by weight.

The aminomethylated vinylaromatic bead polymer formed here can be washed to free it of alkali with completely ion-free water.

The aminomethylated vinylaromatic bead polymer can be reacted with further alkylating agents to give anion exchangers or chelating resins, or else used as ion exchangers.

It is further possible to react the aminomethylated vinylaromatic bead polymers of the invention with halomethyl nitrogen heterocycles, e.g. 2-chloromethylpyridine, 3-chloromethylpyridine or 4-chloromethylpyridine, and thereby prepare chelating resins.

The present invention therefore additionally provides a process for producing anion exchangers and chelating resins, which comprises
a) reacting monomer droplets formed from at least one monovinylaromatic compound and from at least one polyvinylaromatic compound and also optionally a porogen and at least one initiator to form a vinylaromatic bead polymer,
b) converting this vinylaromatic bead polymer in the presence of compounds of the formula (II) and in the presence of compounds of the formula (I) and at least one condensed formaldehyde and in the presence of at least one protic acid to amidomethylated vinylaromatic bead polymer, and
c) converting the amidomethylated vinylaromatic bead polymer to aminomethylated vinylaromatic bead polymer, and
d) finally reacting the aminomethylated vinylaromatic bead polymer with alkylating agent to form anion exchangers and chelating resins.

Preferred alkylating agents for the purposes of the present invention are alkyl halides, haloalcohols, alkyl sulfates, dialkyl sulfates, alkyl oxides, Leuckart-Wallach reagents or combinations thereof in between and/or in succession.

Particular preference is given to using chloromethane, ethylene oxide, propylene oxide and also the Leuckart-Wallach reagents or combinations thereof. Leuckart-Wallach reagents are described by way of example in Organikum, VEB Deutscher Verlag der Wissenschaften, Berlin 1968, 8th edition, page 479.

Suspension media used are preferably water or mineral acids. It is optionally alternatively possible to add bases, depending on the desired product. Preference is given to using water. Useful bases may include sodium hydroxide, potassium hydroxide and basic but non-nucleophilic amines.

Process step d) is preferably performed at temperatures of 20 to 150° C., more preferably at 40° C. to 110° C. Process step d) is preferably performed at pressures from standard pressure to 6 bar, more preferably at standard pressure to 4 bar.

The present invention provides a novel process for preparing amidomethylated vinylaromatic bead polymers that is able to provide specifically phthalimidomethylated bead polymers and aminomethylated bead polymers efficiently, taking into account ecological aspects and in high yield.

Example 1

1.1 Preparation of the Monodisperse Macroporous Bead Polymer Based on Styrene, Divinylbenzene and Ethylstyrene A 10 l glass reactor is charged with 3000 g of demineralized water, and a solution of 10 g of gelatin, 16 g of disodium hydrogenphosphate dodecahydrate and 0.73 g of resorcinol in 320 g of deionized water is added and mixed in. The mixture is equilibrated to 25° C. Subsequently, while stirring, a mixture of 3200 g of microencapsulated monomer droplets having a narrow particle size distribution, composed of 3.1% by weight of divinylbenzene and 0.6% by weight of ethylstyrene (used in the form of a commercial isomer mixture of divinylbenzene and ethylstyrene with 80% divinylbenzene), 0.4% by weight of dibenzoyl peroxide, 58.4% by weight of styrene and 37.5% by weight of isododecane (technical isomer mixture having a high proportion of pentamethylheptane) is added, the microcapsule consisting of a formaldehyde-hardened complex coacervate composed of gelatin and a copolymer of acrylamide and acrylic acid, and 3200 g of aqueous phase having a pH of 12 is added.

The mixture is stirred and polymerized to completion by increasing the temperature in accordance with a temperature program commencing at 25° C. and terminating at 95° C. The mixture is cooled, washed through a 32 μm sieve and then dried at 80° C. under reduced pressure.

This gives 1893 g of a bead polymer with narrow particle size distribution.

1.2. Preparation of a Phthalimidomethylated Monodisperse Macroporous Bead Polymer with the Swelling Agent Dibromomethane A round-bottom flask is charged with 1522 g of dibromomethane. To this are added 105.7 g of bead polymer from example 1.1, 150.1 g of phthalimide and 31.9 g of paraformaldehyde, and then the mixture is left to stir at room temperature for 30 min. 375.1 g of sulfuric acid (96%) is added within 30 min. This is followed by stirring at room temperature for 24 h, then the beads are separated off on a sieve and washed with water, acetone and water.

Volume yield: 670 ml
Nitrogen content (after drying): 5.3%

1.3. Preparation of a Phthalimidomethylated Monodisperse Macroporous Bead Polymer with the Swelling Agent 1,3-Dibromopropane A round-bottom flask is charged with 1206 g of 1,3-dibromopropane. To this are added 105.7 g of bead polymer from example 1.1, 150.1 g of phthalimide and 31.9 g of paraformaldehyde, and then the mixture is left to stir at room temperature for 30 min. 375.1 g of sulfuric acid (96%) is added within 30 min. This is followed by stirring at room temperature for 24 h, then the beads are separated off on a sieve and washed with water, acetone and water.

Volume yield: 690 ml
Nitrogen content (after drying): 5.2%

Example 2

Comparative Example (Noninventive)

2.1 Preparation of a Phthalimidomethylated Monodisperse Macroporous Bead Polymer with the Swelling Agent Dichloroethane A round-bottom flask is charged with 625 g of 1,2-dichloroethane. To this are added 103.6 g of bead polymer from example 1.1, 147.1 g of phthalimide and 31.3 g of paraformaldehyde, and then the mixture is left to stir at room temperature for 30 min. 363.3 g of sulfuric acid (96%) is added within 30 min, and then the mixture is stirred at room temperature for 24 h. Thereafter, the beads are separated off on a sieve and washed with water, acetone and water.

Volume yield: 605 ml
Nitrogen content (after drying): 5.1%

Example 3

Comparative Example (Noninventive)

3.1 Preparation of a Phthalimidomethylated Monodisperse Macroporous Bead Polymer with the Swelling Agent Bromotrichloromethane A round-bottom flask is charged with 1209 g of bromotrichloromethane. To this are added 105.7 g of bead polymer from example 1.1, 150.1 g of phthalimide and 31.9 g of paraformaldehyde, and then the mixture is left to stir at room temperature for 30 min. 375.1 g of sulfuric acid (96%) is added within 30 min. This is followed by stirring at room temperature for 24 h, then the beads are separated off on a sieve and washed with water, acetone and water.

Volume yield: 540 ml
Nitrogen content (after drying): 3.5%

Example 1 demonstrates that, when dibromomethane and 1,3-dibromopropane are used as swelling agents, higher degrees of substitution by amidomethyl groups can be achieved in the bead polymer (see nitrogen content) than by comparison with swelling agents known from the prior art.

What is claimed is:

1. A process for preparing amidomethylated vinylaromatic bead polymers, comprising the steps of reacting at least one vinylaromatic bead polymer with at least one compound of formula (I) or salts thereof

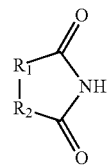

where $R_1$=—CH—($C_1$—$C_6$-alkyl) or —$CH_2$— and $R_2$=—CH—($C_1$—$C_6$-alkyl) or —$CH_2$— or $R_1$ and $R_2$ are two carbon atoms of an aromatic $C_6$ ring optionally substituted by one or two $C_1$—$C_6$—alkyl radicals, or $R_1$ and $R_2$ are each —CH=, and at least one condensed formaldehyde
in the presence of at least one protic acid and
in the presence of at least one dibromoalkane compound selected from the group consisting of dibromomethane, 1,3-dibromopropane and mixtures thereof,
wherein the compounds of the formula (II) used are dibromomethane, 1,3-dibromopropane or mixtures thereof.

2. The process as claimed in claim 1, wherein the protic acid is sulfuric acid.

3. The process as claimed in claim 1, wherein the condensed formaldehyde is paraformaldehyde or trioxane or mixtures of these compounds.

4. The process as claimed in claim 1, wherein the vinylaromatic bead polymer is a styrene/divinylbenzene copolymer.

5. The process as claimed in claim 1, wherein the compound of formula (I) is phthalimide or a salt thereof.

6. The process as claimed in claim 1, wherein the vinylaromatic bead polymer is a monodisperse vinylaromatic bead polymer.

7. The process as claimed in claim 1, wherein the vinylaromatic bead polymer is a macroporous monodisperse vinylaromatic bead polymer.

8. The process as claimed in claim 1, wherein the molar ratio the dibromoalkane compound to the compound of formula (I) is 3.5:1 to 10:1.

9. The process as claimed in claim 1, wherein the molar ratio of the aromatic groups in the vinylaromatic bead polymer to the compound of formula (I) is 0.5:1 to 1.8:1.

10. The process as claimed in claim 1, wherein the molar ratio of the compound of formula (I) to condensed formaldehyde is 0.95:1 to 1.1:1.

11. The process as claimed in claim 1, wherein the molar ratio of the compound of formula (I) to the protic acid used is 10:1 to 1:10.

12. The process as claimed in claim 1, wherein the reaction temperature for the conversion of the vinylaromatic bead polymers to the amidomethylated vinylaromatic bead polymers is between 10° C. and 80° C.

* * * * *